No. 871,233. PATENTED NOV. 19, 1907.
A. L. MUREN.
CHANGEABLE SPEED GEARING.
APPLICATION FILED OCT. 25, 1906.
3 SHEETS—SHEET 3.
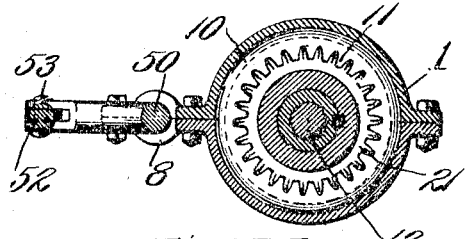
Fig. III.
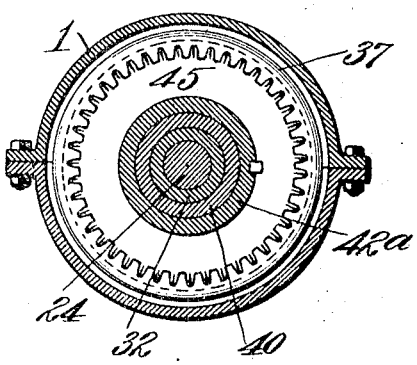
Fig. IV.
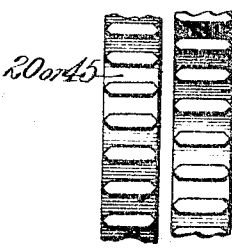
Fig. VI.
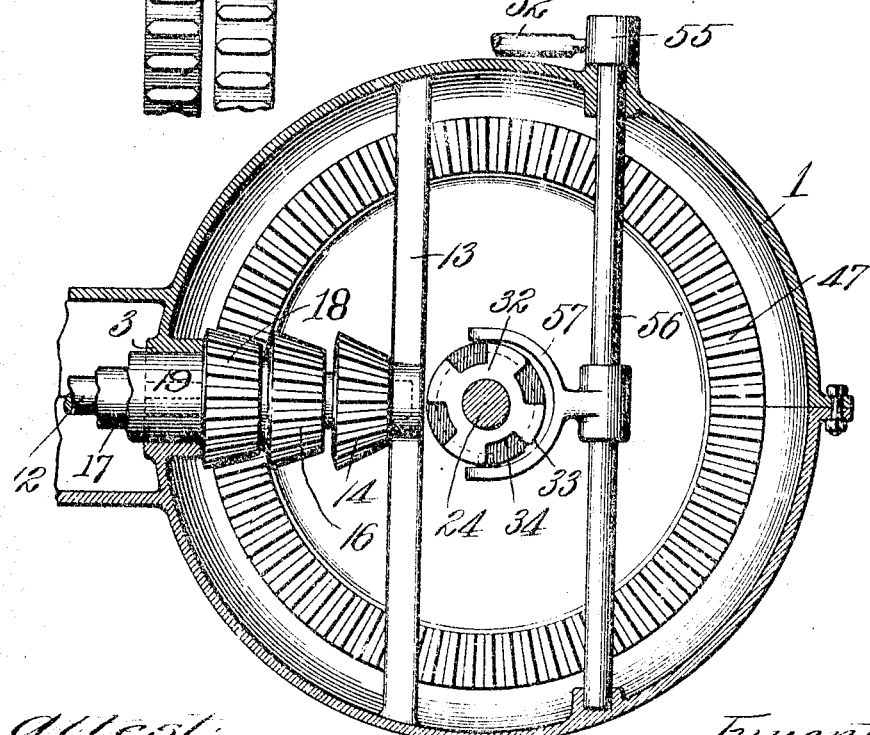
Fig. V.

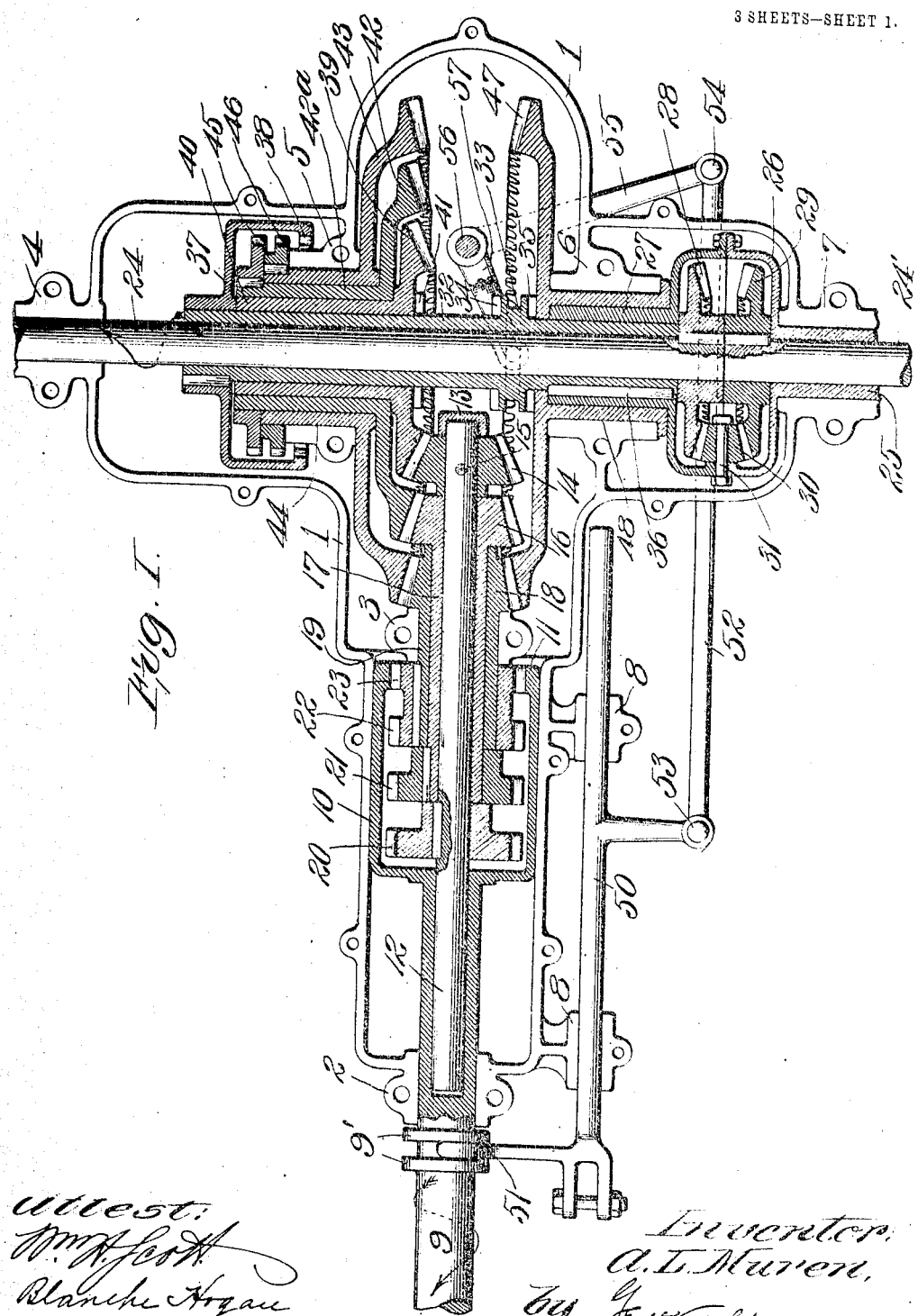

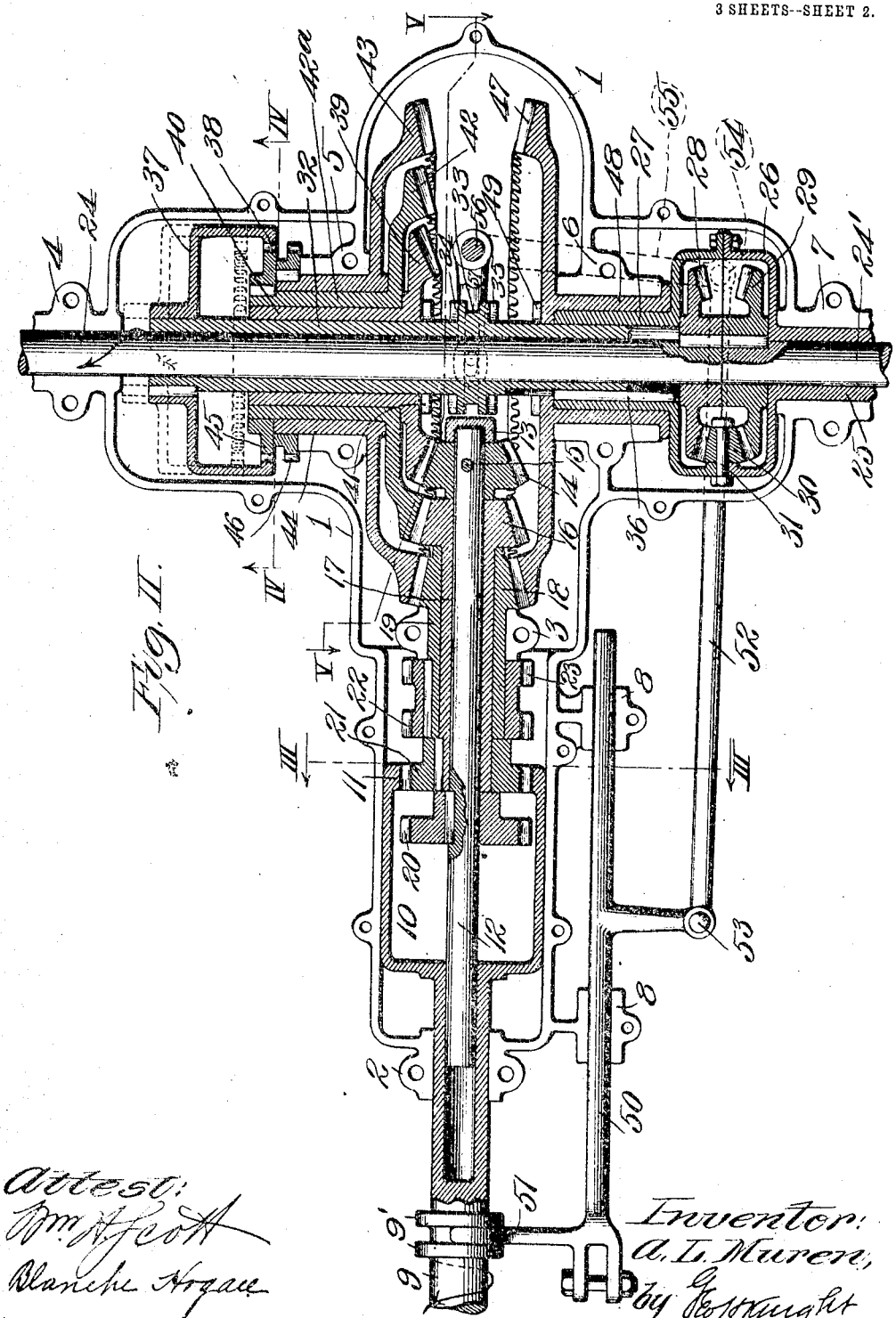

UNITED STATES PATENT OFFICE.

ALBERT L. MUREN, OF BELLEVILLE, ILLINOIS.

CHANGEABLE-SPEED GEARING.

No. 871,233.  Specification of Letters Patent.  Patented Nov. 19, 1907.

Application filed October 25, 1906. Serial No. 340,541.

*To all whom it may concern:*

Be it known that I, ALBERT L. MUREN, a citizen of the United States of America, residing in Belleville, in the county of St. Clair and State of Illinois, have invented certain new and useful Improvements in Changeable-Speed Gearings, of which the following is a full, clear, and exact description, reference being had to the accompanying drawings, forming part of this specification.

My invention relates to a changeable speed gearing for use in driving shafts at varying degrees of speed, the present gearing being more particularly intended for use in the operation of motor vehicles.

Figure I is a longitudinal section taken through my gearing with the parts illustrated in the positions assumed when the gearing is to be driven reversely or in a backward direction. Fig. II is a similar view to Fig. I with the gearing parts in the positions assumed when the gearing is to be driven in a forward direction and at an intermediate speed. Fig. III is a cross section taken on line III—III, Fig. II. Fig. IV is a cross section taken on line IV—IV, Fig. II. Fig. V is a cross section taken on line V—V, Fig. II. Fig. VI is an elevation of portions of the peripheries of the transmission pinions in the gearing.

1 designates a housing having associated therewith journal members 2, 3, 4, 5, 6, and 7, in which the shafts and other parts of my gearing are journaled.

9 designates a slidable drive main shaft and 10 is a hollow internal gear clutch member carried by said shaft and having an internal gear 11, the said clutch member being preferably of barrel shape. The drive shaft is tubular at its forward end.

12 is an auxiliary drive shaft, the rear end of which is loosely fitted in the forward end of the drive shaft and the forward end of which is supported by a cross bar 13 attached to the housing 1.

14 designates a high speed transmission pinion fixed to the auxiliary drive shaft 12 at its forward end by suitable means, such as a key 15.

16 is an intermediate speed transmission pinion loosely mounted on the auxiliary drive shaft and provided with a sleeve 17.

18 is a low speed transmission pinion loosely mounted on the sleeve of the intermediate speed transmission pinion and having a sleeve 19.

20 is a high speed clutch wheel fixed to the auxiliary drive shaft 12 and which is complementary to the forward high speed transmission pinion 14.

21 is an intermediate speed clutch wheel fixed to the sleeve 17 of the intermediate speed transmission pinion 16 and which is complementary to said intermediate speed transmission pinion.

22 is a low speed clutch wheel fixed to the sleeve 19 of the low speed transmission pinion 18 to which low speed transmission pinion said low speed clutch wheel is complementary. 23 is a reverse clutch wheel that is also fixed to the low speed transmission pinion sleeve 19 and which is preferably formed integral with the low speed clutch wheel 22.

All of the clutch wheels 20, 21 22 and 23 are adapted to be meshed by the internal gear 11 of the clutch member 10 at different times, as a consequence of the drive shaft 9 being shifted longitudinally to move said clutch member 10 relative to said clutch wheels, as will more fully hereinafter appear. The drive shaft 9 is supported in the rear journal box 2 of the housing 1 and the sleeves with which the speed pinions and clutch wheels are associated are supported in the forward journal box 3 in which the outermost sleeve 19 of said sleeves is seated.

24 and 24' designate sections of a divided driven shaft which may in the use of the gearing upon a motor vehicle be in the form of the driving axle of said vehicle. At one side of the housing 1, the driven shaft section 24 is journaled in the journal box 4 of said housing.

Loosely seated in the journal box 7 at the opposite side of the housing is a sleeve 25 in which the driven shaft operates.

26 is a carrier, preferably of shell form, that is fixed to the sleeve 25 and from which extends a sleeve 27 located in the journal box 6 of the housing 1.

28 and 29 are mating gear wheels of a differential gear portion of my gearing, the said mating gear wheels being fixed respectively to the driven shaft sections 24 and 24'.

30 is a pinion carried by the carrier 26 to which it is journaled preferably by a pin or bolt 31. The pinion 30 constitutes a member of the differential gear and it has the utility of transmitting motion from the gear wheel 28 to the gear wheel 29 or in other words from the driven shaft section 24 to the driven shaft section 24'. The purpose in introducing the differential gear into my gearing in connection with the sectional driven shaft, is to provide for the operation of the two shaft sections in unison while at the same time permitting differential rotation of the two sections when occasion requires it.

32 designates a sleeve loosely mounted upon the driven shaft section 24 and susceptible of longitudinal movement on said driven shaft section. This sleeve is provided with a collar or annular rim 33 at the two sides of which are clutch teeth 34 and 35. One end of the sleeve extends into the sleeve 27 of the differential gear carrier 26 and is connected to said carrier sleeve by a spline 36 whereby these parts are united for rotation combinedly while permitting longitudinal movement of the sleeve 32 on the driven shaft section 24.

37 is an internal gear clutch member fixed to the sleeve 32 also being preferably of barrel shape. 38 are the gear teeth of this gear clutch member. By reason of the internal gear clutch member 37 being fixed to the sleeve 32 said member is susceptible of longitudinal movement with said sleeve.

39 designates a secondary high speed transmission gear wheel that is provided with a hub sleeve 40 loosely fitted to the sleeve 32. This high speed transmission gear wheel meshes with the high speed pinion 14 and it is provided with clutch teeth 41 that are adapted to be engaged by the clutch teeth 34 of the sleeve 32.

42 is a secondary intermediate speed transmission gear wheel that meshes with the intermediate speed transmission pinion 16 and is provided with a hub sleeve 42ª which surrounds the hub sleeve of the secondary high speed transmission gear wheel 39.

43 is a secondary low speed transmission gear wheel that meshes with the low speed transmission pinion 18 and is provided with a hub sleeve 44 which surrounds the hub sleeve of the secondary intermediate speed transmission gear wheel 42.

45 is a clutch wheel carried by the hub sleeve of the secondary intermediate speed transmission gear wheel 42, and 46 is a clutch wheel carried by the hub sleeve of the secondary low speed transmission gear wheel 43. Both of these clutch wheels 45 and 46 are adapted to mesh at different times, according to the speed to be acquired during the operation of the gearing, with the teeth of the internal gear clutch member 37.

47 designates a reverse gear wheel which is opposed to the secondary transmission gear wheels 39, 42 and 43, and the teeth of which mesh with the low speed transmission pinion 18. The reverse gear wheel is provided with a hub 48 that is seated in the journal box 6 of the housing 1 and surrounds the sleeve 27 of the differential gear carrier 26. The reverse gear wheel is provided at its side facing the clutch collar on the sleeve 32 with clutch teeth 49 (see Fig. II) that are adapted to be engaged by the clutch teeth 35 of said collar.

50 designates a main shifter rod that is mounted in guides 8 projecting from the housing 1 and provided with a fork 51 that is fitted to the main drive shaft 9 through the medium of rims 9' spaced apart from each other on said shaft. The main shifter rod is adapted to be moved longitudinally by power applied thereto in any suitable manner and when so moved acts to move the main drive shaft in a longitudinal direction, with the result of shifting the internal gear clutch member 10 relative to the speed clutch wheels 20, 21 and 22, and the reverse clutch wheel 23, in order that the gear teeth of said clutch member 10 may be brought into mesh with either of said speed clutch wheels.

52 is a supplemental shifter rod that is connected at 53 to the main shifter rod 50. The supplemental shifter rod has in turn connected to it at 54 a lever 55 that is fixed to a rock shaft 56 mounted in the housing 1 and extending transversely of the driven shaft section 24, as seen most clearly in Fig. V.

57 is a fork fixed to the rock shaft 56 and fitted to the clutch collar 33 of the sleeve 32, the said fork having the office of imparting longitudinal movement to said sleeve 32 when the shifter rods 50 and 52 are moved.

In the practical use of my gearing the operation is as follows: When the parts are in the positions illustrated in Fig. I, the gearing is set for reverse motion, due to the reverse clutch wheel 23 being in mesh with the gear teeth of the internal gear clutch member 10 carried by the drive shaft 9, the reverse gear wheel 47 being in mesh with the low speed transmission pinion 18 (with which it is in mesh at all times) and the clutch teeth 35 carried by the sleeve 32 being in engagement with the clutch teeth 49 of the reverse gear wheel 47. The sleeve 32 being connected with the carrier 26 through the sleeve 27 of said carrier, the carrier is rotated with the reverse gear wheel 47 and the pinion 30 associated with said carrier is caused to operate between the differential gear wheels 28 and 29, with the result of imparting rotation to the driven shaft sections 24 and 24' in the direction indicated by the arrow Fig. I. When the gearing is to be operated in a forward direction the drive shaft 9 is shifted longitudinally and in a rearward direction to move the internal gear clutch member 10 toward and into engagement with the low speed clutch wheel 22 through the medium of the main shifter rod 50, the teeth of the clutch member being carried to said low speed clutch wheel from either their positions in engagement with the reverse clutch wheel 23 or an inoperative position between the reverse gear wheel and the low speed clutch wheel. At the same time that the drive shaft and its internal gear clutch member are shifted, longitudinal movement is imparted to the sleeve 32 whereby its clutch collar 33 is moved in a direction away from the reverse gear wheel 47 and in the event of the clutch teeth 35 of said sleeve being in engagement with the clutch teeth of said gear wheel they are withdrawn from such engagement. The shifting of the sleeve 32 in a longitudinal direction causes the internal gear clutch member 37 fixed to said sleeve to be carried from a position in which it was previously located inwardly from the clutch wheel 46 attached to the low speed secondary transmission gear wheel 43 into engagement with said clutch wheel 46. As a consequence the low speed clutch wheel 22 which is driven by the drive shaft 9 is caused to drive the low speed transmission pinion 18, said low speed transmission pinion acting to drive the secondary low speed transmission gear wheel 43, which in turn, through the medium of its clutch wheel 46, drives the sleeve 32. The sleeve in turn acts to drive the carrier 26 and the other parts of the differential gear by which the driven shaft sections 24 and 24' are operated. The drive shaft 9 being shifted to a greater degree the teeth of the internal gear clutch member 10 are carried to the intermediate speed clutch wheel 21, and the parts of the gearing will be at this time in the positions illustrated in Figs. II, the internal gear clutch member 37 being at such time in engagement with the clutch wheel 45, fixed to the sleeve 42ª of the secondary intermediate speed transmission gear wheel 42. The intermediate speed clutch wheel 21 then acts to drive the intermediate speed transmission pinion 16 and said intermediate speed transmission pinion drives the intermediate gear wheel 42, and the clutch wheel 45 associated therewith, whereby the meshing internal gear clutch member 37 is driven and in turn serves to drive the sleeve 32 that operates the differential gear members. A still further longitudinal movement of the drive shaft causes the teeth of the internal gear clutch member 10 to be carried into mesh with the high speed clutch wheel 20, and said high speed clutch wheel serves to operate the auxiliary drive shaft 12 and the high speed transmission pinion 14. When the internal gear clutch member 10 is moved to effect engagement between its teeth and the high speed clutch wheel 20 the sleeve 32 is simultaneously shifted in a longitudinal direction to an extent sufficient to carry the clutch teeth 34 carried thereby into engagement with the clutch teeth 41 carried by the secondary high speed transmission gear wheel 39 and the internal gear clutch member 37 into the position illustrated in dotted lines Fig. II, thereby removing said internal gear clutch member from engagement with the clutch wheel 45. As a consequence motion is transmitted directly from the secondary high speed transmission gear wheel 39 driven by the high speed transmission pinion 14 to the sleeve 32 to cause said sleeve to drive the differential gear carrier 26 and the other parts of the differential gear at a maximum speed in driving the driven shaft sections 24 and 24'.

I claim:—

1. In a changeable speed gearing, the combination of a driven shaft, a longitudinally shiftable clutch member having an internal gear and a sleeve whereby it is mounted on said shaft and having driving connection therewith, a plurality of sleeved gear members, either of which is adapted to coöperate with the internal gear of said shiftable clutch member, and means for driving said gear members singly, substantially as set forth.

2. In a changeable speed gearing, the combination of a driven shaft, a driving clutch member having an internal gear and a sleeve whereby it is mounted on the shaft, shiftable longitudinally of said shaft and having driving connection therewith, a plurality of sleeved gear members surrounding the sleeve of said driving clutch member and adapted to coöperate with the internal gear thereof, and means for driving said gear members singly, substantially as set forth.

3. In a changeable speed gearing, the combination of a driven shaft, a driving clutch member having an internal gear and a sleeve whereby it is mounted on the shaft, shiftable longitudinally of said shaft and having driving connection therewith, a plurality of sleeved gear members surrounding the sleeve of said driving clutch member, and means for driving said gear members singly; the inner one of said gear members and the sleeve of said driving clutch member being provided with clutch means, substantially as set forth.

4. In a changeable speed gearing, the combination of a driven shaft, a driving clutch member having an internal gear and a sleeve whereby it is mounted on the shaft, shiftable longitudinally of said shaft and having driving connection therewith, a plurality of sleeved gear members surrounding the sleeve of said driving clutch member, means for driving said gear members singly, a clutch member carried by the inner one of said gear members, a clutch member carried by the sleeve of said driving clutch member and arranged for engagement with the clutch member of the said inner gear member, substantially as set forth.

5. In a changeable speed gearing, the combination of a driven shaft, a driving clutch member shiftable longitudinally of said shaft and having driving connection therewith, a plurality of gear members surrounding said driving clutch member, means for driving said gear members singly, a clutch wheel carried by one of said gear members, and an internal gear clutch member carried by said driving clutch member and arranged for engagement with said clutch wheel, substantially as set forth.

6. In a changeable speed gearing, the combination of a driven shaft, a barrel shaped driving clutch member shiftable longitudinally of said shaft and having driving connection therewith, a plurality of gear members surrounding said driving clutch member, means for driving said gear members singly, a clutch member carried by one of said gear members, a clutch member carried by said driving clutch member and arranged for engagement with the clutch member of said gear member; one of said members and said driving clutch member being arranged for interlocking engagement with each other, substantially as set forth.

7. In a changeable speed gearing, the combination of a driven shaft, a driving clutch member shiftable longitudinally of said shaft and having driving connection therewith, a plurality of gear members surrounding said driving clutch member, means for driving said gear members singly, a clutch wheel carried by one of said gear members and an internal gear clutch member carried by said driving clutch member and arranged for engagement with said clutch wheel; one of said gear members and said driving clutch member being arranged for interlocking engagement with each other, substantially as set forth.

8. In a changeable speed gearing, the combination of a driven shaft, a driving clutch member shiftable longitudinally of said shaft and having driving connection therewith, a plurality of gear members surrounding said driving clutch member, means for driving said gear members singly, clutch wheels carried by said gear members, and an internal gear clutch member carried by said driving clutch member and arranged for engagement with either of said clutch wheels, substantially as set forth.

9. In a changeable speed gearing, the combination of a driven shaft, a driving clutch member shiftable longitudinally of said shaft and having connection therewith, a plurality of gear members surrounding said driving clutch member, means for driving said gear members singly, clutch wheels carried by said gear members, and an internal gear clutch member carried by said driving clutch member and arranged for engagement with either of said clutch wheels; one of said gear members and said driving clutch member being arranged for interlocking engagement with each other, substantially as set forth.

10. In a changeable speed gearing, the combination of a driven shaft, a driving barrel shaped clutch member having a sleeve mounted on said shaft and longitudinally shiftable thereon, means providing driving connection between said sleeve and said shaft, a reverse gear wheel surrounding the sleeve of the driving clutch member, and means for driving said reverse gear wheel; said sleeve and gear wheel being provided with clutch members adapted to coöperate with each other, substantially as set forth.

11. In a changeable speed gearing, the combination of a shaft, a driving clutch member shiftable longitudinally of said shaft and having driving connection therewith, a plurality of transmission gear members surrounding said driving clutch member and arranged for coöperation therewith, pinions coöperating with said transmission gear members, clutch wheels for driving said pinions, a longitudinally shiftable drive shaft provided with an internal gear clutch member for engagement with said clutch wheels, and means for simultaneously shifting said drive shaft and said first named driving clutch member, substantially as set forth.

ALBERT L. MUREN.

In presence of—
R. W. ROLUEQUES.
EDMUND BURKE.